United States Patent [19]
Chennakeshu et al.

[11] Patent Number: 6,091,936
[45] Date of Patent: *Jul. 18, 2000

[54] METHOD AND APPARATUS FOR REDUCING CO-CHANNEL INTERFERENCE

[75] Inventors: Sandeep Chennakeshu; Stanley Lynn Reinhold, both of Cary, N.C.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/625,754

[22] Filed: Mar. 29, 1996

[51] Int. Cl.$^7$ ...................................................... H04B 7/01
[52] U.S. Cl. ............................ 455/63; 455/502; 370/337; 375/347
[58] Field of Search .................................. 455/12.1, 13.2, 455/33.1, 33.4, 34.1, 51.2, 53.1, 54.1, 56.1, 59, 63, 67.1, 67.7, 422, 450, 517, 524, 502, 503; 370/337, 347, 350; 375/346, 347

[56] References Cited

U.S. PATENT DOCUMENTS

| | | | |
|---|---|---|---|
| 4,598,285 | 7/1986 | Hoshen | 340/825.5 |
| 5,228,029 | 7/1993 | Kotzin | 370/337 |
| 5,463,400 | 10/1995 | Tayloe | 342/352 |
| 5,485,463 | 1/1996 | Godoroja | 455/38.1 |
| 5,590,403 | 12/1996 | Cameron et al. | 455/59 |
| 5,610,558 | 3/1997 | Mittel et al. | 455/260 |
| 5,663,990 | 9/1997 | Bolgiano et al. | 375/347 |

FOREIGN PATENT DOCUMENTS

| | | |
|---|---|---|
| WO 91/16794 | 10/1991 | WIPO . |
| WO 95/12255 | 5/1995 | WIPO . |
| PCT/US/97/ 04969 | 3/1997 | WIPO . |

*Primary Examiner*—Reinhard J. Eisenzopf
*Assistant Examiner*—Sam Bhattacharya
*Attorney, Agent, or Firm*—Jenkens & Gilchrist, P.C.

[57] ABSTRACT

The amount of co-channel interference which occurs for any given time slot in a cellular communication system can be reduced by distributing or averaging out the co-channel interference to other time slots. This averaging out results from the staggering of control and traffic signals for a given time slot wherein the staggering is relative to the same time slot in the same frequency channel at neighboring clusters of cells. If a transmitter is on a satellite which transmits to the various clusters, the method and apparatus prevents an interfering signal from interfering with the entire time slot. The inventive method and apparatus requires synchronization of the control and traffic signal transmission to the clusters relative to each other so that the amount of delay introduced while staggering the time slots can be predicted and controlled.

13 Claims, 4 Drawing Sheets

"PRIOR ART"

METHOD AND APPARATUS FOR REDUCING CO-CHANNEL INTERFERENCE

BACKGROUND OF THE INVENTION

1. Technical Field of the Invention

The present invention relates to cellular telephone systems and, in particular, to a method and apparatus for effectuating wireless communication with reduced interference.

2. Description of Related Art

Cellular telephone systems divide a large service area into a number of smaller discrete geographical areas called "cells". Conventional cells typically range in size from about one-half to about twenty kilometers in diameter. Each cell is contiguous with multiple adjacent cells to provide continuous coverage throughout the service area. A base station including a plurality of transceivers capable of operating independently on different radio frequencies is provided for each of the cells. Via the transceivers, the base stations engage in simultaneous communications with plural mobile stations operating within the area of the associated cell. The base stations further communicate via data links (and voice trunks) with a central control station, commonly referred to as a mobile switching center, which functions to selectively connect telephone calls to the mobile stations through the base stations and, in general, control operation of the system.

There are a plurality of radio frequencies in the cellular frequency band available to cellular telephone system providers for use in communicating with mobile stations. A majority of the available radio frequencies are reserved for the voice channels used in carrying telephone calls. In an analog cellular telephone system, like the known advanced mobile phone system (AMPS), there is one frequency division multiple access (FDMA) analog voice channel per frequency. In a digital cellular telephone system, like the known D-AMPS (IS136) or Global System for Mobile (GSM) Communications, there are a plurality of time division multiple access (TDMA) digital voice channels (time slots) per frequency. The remaining radio frequencies in the cellular frequency band are reserved as control channels for carrying the control signals (commands) used to direct operation of the system. Alternatively, the control channel comprises one time slot on a frequency shared with plural voice channels. The control signals transmitted over the control channel includes broadcast system information, call originations, page signals, page response signals, location registration signals, voice channel assignments, maintenance instructions, and cell selection or reselection instructions.

A common cellular system frequency assignment architecture provides for a normal frequency band plus an extended frequency band within the overall cellular frequency band. In one example, a first plurality of the radio frequencies in the normal band portion of the cellular frequency band are reserved for the control channels utilized by the system on an at least one control channel per cell basis to carry cellular system operation control signals and messages between mobile stations and base stations. A second plurality of the frequencies from both the normal and extended bands are reserved for the voice channels, and are typically divided more or less equally amongst the cells and allocated on as needed basis by the system to subscribers for carrying cellular voice communications between mobile stations and base stations.

A cellular service area can cover a large geographic region, and in many instances there will be a need for a large number of cells. Often times, the number of cells needed exceeds in number the number of cells provided by dividing the available frequencies amongst the cells in such a manner as to handle expected subscriber usage per cell. In such a case there are simply not enough frequencies in the cellular frequency band for unique assignment to the included cells. Accordingly, in order to provide sufficient call handling capacity throughout the service area, the cells are grouped into clusters of cells and the frequencies in the cellular frequency band are divided amongst and reused in each of the clusters.

In addition to such conventional cells, new cells are proposed in which the ground base stations are replaced by satellites wherein the cell size can be designed to be significantly larger than the size of a conventional cell. By way of example, a proposed cell could be as large as a state. The actual size depends, of course, upon design requirements such as the number of users in relation to system throughput capability. Aside from the apparent structural or physical difference between rigid land based base stations and orbiting satellite transceivers, and the difference in the potential geographic size of the cells used for each, the communications systems and system architectures for the proposed cells and the existing conventional cells are similar.

For both the proposed and the conventional cells, each cell is assigned use of a predetermined set of frequencies from the cellular frequency band for use in providing its analog and/or digital voice channels. The availability of multiple voice channels per cell permits base stations to simultaneously handle many telephone conversations with many mobile stations. The frequencies used for the voice channels assigned to a given cell are preferably spaced apart from each other across the frequency spectrum of the cellular frequency band. This serves to minimize the instances and adverse affects of adjacent channel interference.

Because only a limited number of frequencies are available in the cellular frequency band, the same frequencies that are assigned to one cell are also assigned to (i.e., reused by) other cells in distant parts of the service area. Typically, adjacent cells are not assigned to use the same frequency. Furthermore, the power levels of the signal transmissions in a conventional land based cellular phone system on any given frequency are limited in strength so as to limit propagation beyond the cell area. The foregoing precautions serve to reduce instances of interference from cells using the same frequency, which interference is known as co-channel interference. Co-channel interference is caused by reuse of that same frequency in a distant cell and is the specific result of two users attempting to use the same frequency channel. In the case of a digital phone system, co-channel interference is a result of two users trying to use the same time slot of the same frequency channel at the same time in a manner where each interferes with the other. In the case of a proposed satellite based system, co-channel interference results from the "bleeding" of a focused beam type signal transmission from a satellite to a neighboring cell. This type of interference which can occur when the transceiver is a satellite can apply to the analog as well as digital signal transmissions similar to the ground based transceivers.

In spite of the planning by service providers in assigning the frequencies in frequency reuse cellular or satellite systems and regulating system operation, however, it is known that instances of co-channel interference do occur. This interference often adversely affects system operation by, for example, degrading voice quality on the voice channels or interfering with the transmission and reception of control signals on the control channels. For digital communications systems, the mobile switching center functions to dynamically allocate the time slots within the assigned frequencies, which are available in any one cell among the plurality of mobile stations located within the cell area that desire communications to try to avoid potential co-channel interferences. Unfortunately, instances of co-channel interference are still known to occur.

One reason for this relates to the inherent limitations in the capacity of the allocated frequency spectrum for such communications in relation to demand. Typically, all cells are not fully loaded. This minimizes the probability of the same channel being occupied in a co-channel cell. However, with more demand for capacity as the number of users in a cell increase, there is a greater likelihood of co-channel interference.

More specifically, in a conventional system, a particular user may emit a signal sufficiently strong enough to extend from one cluster of cells to another cluster of cells wherein the same frequency is in use by another user. In a satellite system, wherein the satellite beams down to a target cell or a target cluster, some of the signal may radiate into a neighboring cell or cluster and can interfere with another user in a neighboring cell utilizing the same frequency. In the case where the communications systems are digital and include the proposed satellite system, the problem of co-channel interference is more acute because all communications tend to be synchronized by the satellite. Thus, two interfering time slots are synchronized and therefore tend to interfere with each other for the duration of the time slot.

There is, therefore, a need for a method and apparatus for use in cellular telephone systems that facilitates a more efficient use of the cellular frequency band which minimizes instances of co-channel interference.

SUMMARY OF THE INVENTION

In a frequency reuse-type cellular telephone system, the cellular frequency band is divided into a plurality of groups of frequencies, with each group assigned to multiple cells. For one embodiment of the present invention, the groups of frequencies, (i.e., channels), from one cluster of cells are then staggered in time relative to the groups of channels of neighboring clusters of cells, wherein the groups of channels from each of the clusters of cells are largely the same, if not identical. The effect of this signal staggering is to spread out the interfering signal and, therefore, to reduce the amount of co-channel interference seen at any given time slot of a digital signal. To accomplish this, however, the transmitted signals must be staggered relative to a known clock reference. By staggering data communications in this fashion, the average amount of co-channel interference is spread across a given cellular frequency band, and the amount of co-channel interference is minimized thereby allowing signal reconstruction circuitry a better opportunity to clearly reconstruct a signal. The inventive methods and apparatus are applicable both to conventional base stations as well as to proposed satellite systems or to any other system in which co-channel interference can be a problem.

In one embodiment of the invention, a control station on the ground transmits control signals to a satellite specifying the timing parameters which correspond to a specific transmission by the satellite. At a minimum, the timing parameters specify an amount of delay or staggering for each of the signals transmitted to the particular cell or cluster of cells.

In another embodiment of the invention, in which a plurality of conventional clusters having a plurality of cells, each cell having a transmitter, there is one timing controller provided for each cluster of cells. This timing controller is coupled to each of the transmitters to each of the cells within the cluster and provides the appropriate control signals for introducing the desired amount of delay for staggering for the communication signals generated within the cluster. For this embodiment, each of the timing controllers are also coupled to one clock whose value is used to synchronize the internal clocks of each of the timing controllers, thereby synchronizing the operation of the timing controllers. As may be seen therefore, the timing controllers are able to introduce prespecified amounts of delay or staggering relative to each other in a precise manner.

In yet another embodiment of the invention, a timing controller is provided for every cell within a cluster. Within this embodiment, each timing controller coupled to a cell, and accordingly, controls the amount of delay or stagger for the communication transmissions to that particular cell. For this embodiment, each of the timing controllers are coupled to each other, either directly or indirectly, so as to synchronize the control of the transmissions to the various cells within the cluster. In this embodiment, one clock source is used to synchronize the internal clocks of each of the timing controllers used to control each of the cells within the cluster.

An inventive method includes, in one embodiment, delaying the transmission of all control and traffic channels within a first cluster by first a prespecified amount. The control and traffic signals in a neighboring cluster, namely a second cluster, are delayed by a second prespecified amount. The first and second prespecified amounts of delay are unequal in relation to each other and are unequal to other neighboring clusters. In one embodiment, seven clusters are arranged and grouped together, thereby resulting in there being six different amounts of prespecified delay for six of the clusters while one cluster transmits traffic and control signals with no delay. Each of the seven clusters, therefore, transmits corresponding time slots at a different time.

As may be seen in this embodiment, therefore, the cluster whose control and traffic signals are transmitted with no delay, or with a prespecified amount of delay being equal to zero, forms a timing reference for the other neighboring clusters.

As may be understood, such staggering of control and traffic signal transmission requires synchronization of the signal transmissions from cluster to cluster. Such synchronization is performed in several ways. In one embodiment, the prespecified delay times are determined relative to the signal transmissions of the reference cluster. In another embodiment, a timing controller specifies to the transmitter the actual transmission times of the traffic and control signals. As may be seen, the timing controllers are in communication with each other to provide the synchronized operation.

In yet another embodiment of the invention, a timing controller is provided for every cell of a cluster wherein the timing is evenly staggered within the cell. In the inventive method, the control and traffic signals are delayed in differing amounts at the cell level rather than at the cluster level.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
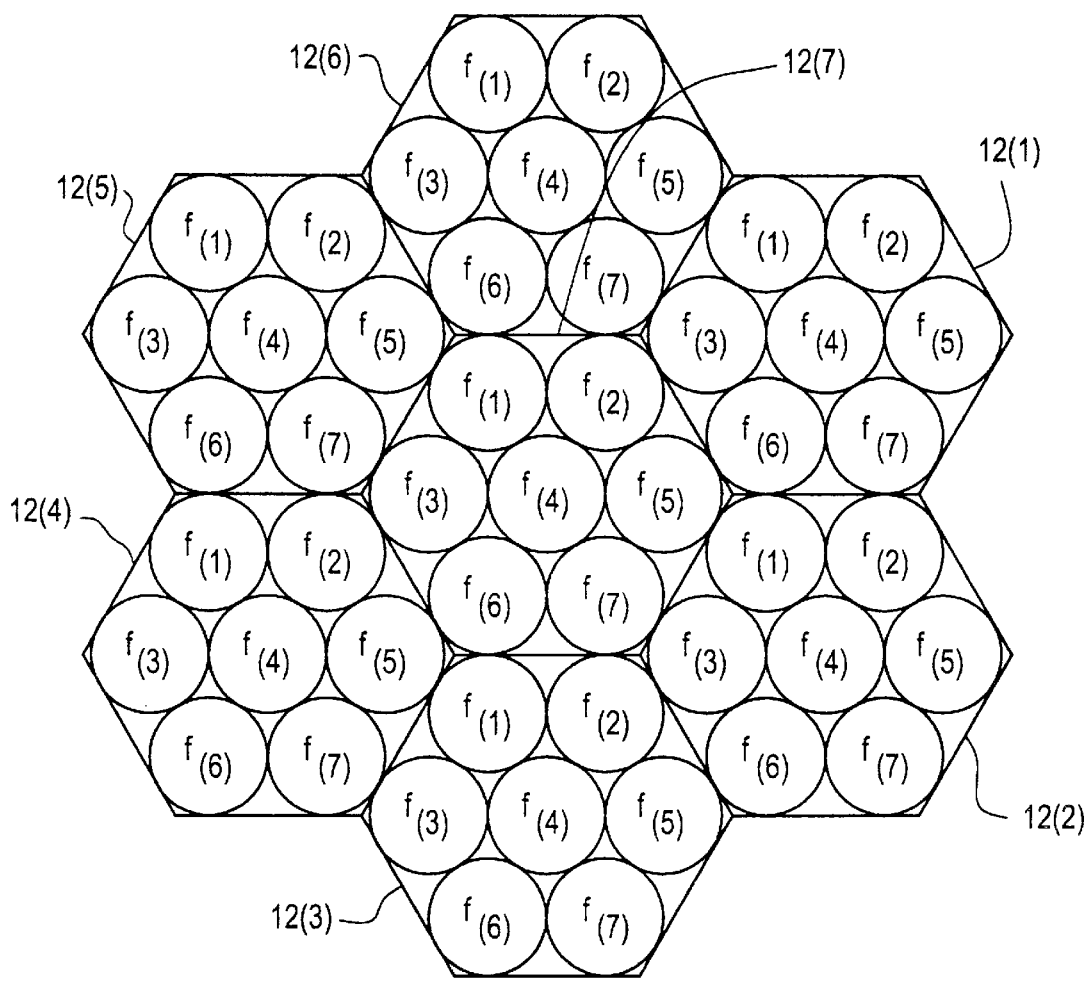
FIG. 1 is an exemplary cell diagram schematically illustrating the frequency assignment architecture of a frequency reuse cellular telephone system.

Reference is now made to FIG. 1 wherein there is illustrated a known cell structure and frequency assignment architecture for use in a radio frequency reuse cellular telephone system. An arbitrary geographic region (hereinafter "the service area") is divided into a plurality of contiguous cells, for example, f(1)–f(7) schematically represented by circles. Each cell f(1)–f(7) is assigned at least one frequency and may be assigned a large number of frequencies for communication. Each frequency which is assigned, is unique relative to the other assigned frequencies in cells f(1)–f(7). It is understood that the use of circles for the cells is for explanatory purposes only and that cell shapes are subject to specific design considerations. By way of example, the cells could be defined as having shapes which are hexagonal, square, triangular, etc. The cells f(1)–f(7) are then grouped into clusters 12 (outlined in bold to ease recognition). It is understood, of course, that each cluster 12 may have more or less cells f(1)–f(7) as needed.

Continuing to refer to FIG. 1, each cell f(1) uses the same frequency or group of frequencies as the cell f(1) in a neighboring cluster 12(1)–12(7). In a digital system, therefore, co-channel interference can occur if a given time slot in cell f(1) interferes with the same time slot in cell f(1) of a neighboring cluster 12(1)–12(7).

Referring to FIG. 1, it will be noted that in the frequency reuse architecture adjacent cells are typically not assigned use of the same radio frequency. Reuse of an identical radio frequency in the service area is preferably made with a separation of at least one cell f(1)–f(7) along with a regulation of broadcast power from each cell to constrain radio propagation substantially within the cell area. Furthermore, it will be noted that typically no one cell f(1)–f(7) utilizes adjacent radio frequencies in the cellular band.

In spite of the precautions taken to avoid interference, it is known that interference does occur in cellular systems like that previously described. One aspect of this interference originates from same analog or digital channel communications occurring simultaneously in the cells f(1)–f(7) of other clusters 12 (i.e., co-channel interference). In spite of any imposed broadcast power limitations, a certain amount of the radio frequency energy of those voice communications propagates beyond the respective cell boundaries and interferes with the frequency channel(s) of corresponding cells f(1)–f(7) in adjacent clusters 12(1)–12(7).

Figure 2:
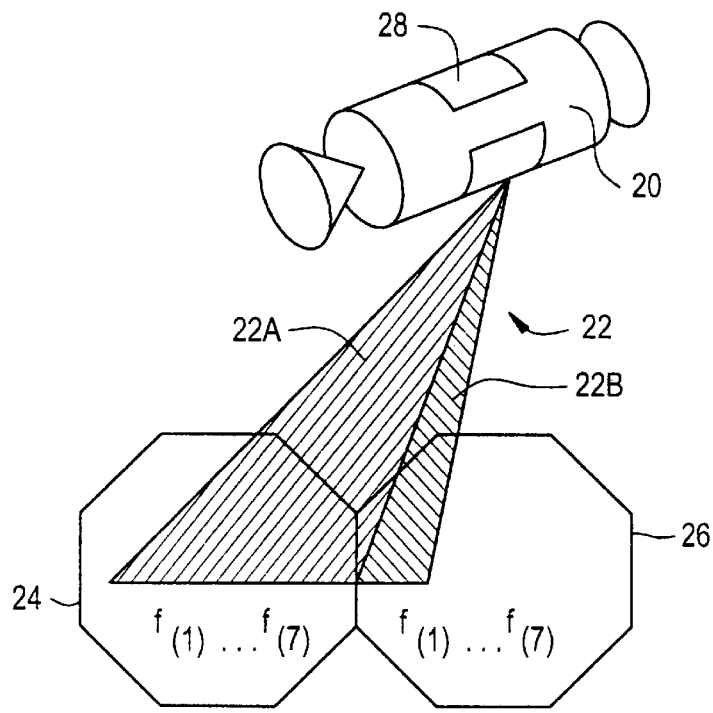
FIG. 2 illustrates the co-channel interference which can occur with a satellite based transceiver.

Referring now to FIG. 2, there is shown a diagram which illustrates potential co-channel interference in a proposed satellite based system for cellular communications. As may be seen, satellite 20 transmits a beam 22 toward cell cluster 24. In the example of FIG. 2, beam 22 does not merely radiate cluster 24, but also partially radiates cluster 26. In the example, beam portion 22a radiates cluster 24, while beam portion 22b partially radiates cluster 26. It is beam portion 22b which can become an interfering signal causing co-channel interference in cluster 26.

Figure 3:
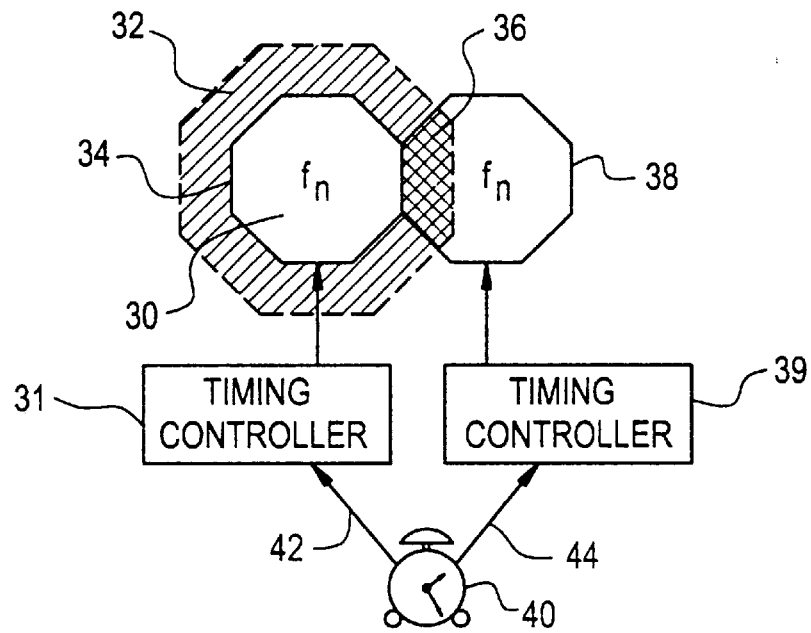
FIG. 3 illustrates the co-channel interference which can occur with a ground based base station.

Referring now to FIG. 3, there is shown a cluster 30 wherein a communication signal 32 radiates beyond the perimeter 34 of cluster 30 and radiates into a portion 36 of cluster 38. It is within portion 36 of cluster 38 that co-channel interference may occur.

The potential co-channel interference as illustrated in FIGS. 2 and 3, may be reduced, in the case of a digital communication system using time division multiple access (TDMA), by staggering the time slots.

Figure 4:
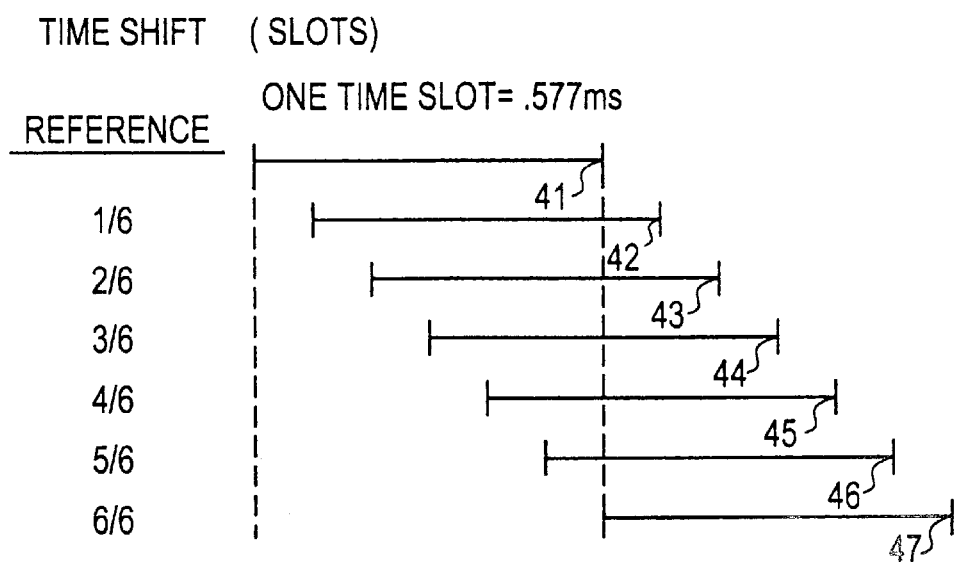
FIG. 4 is a timing diagram that illustrates signal staggering.

Referring now to FIG. 4, there is shown one embodiment wherein corresponding time slots of seven adjacent clusters, as shown in FIG. 1, are staggered relative to each other. Thus, by way of example, if one time slot has a period of 577 milliseconds, then each of the time slots are staggered a multiple of ⅙ of 577 milliseconds relative to the other corresponding time slots in the adjacent clusters. As may be seen, time slots 42–47 are all staggered ⅙ of a time slot period, each in a different multiple of ⅙ of a time slot so that there is no interference for the entire time slot of the reference time slot 41.

The timing diagram of FIG. 4 is illustrative of the staggering of traffic signals as well as control signals which, as may be seen in FIG. 4, causes an interfering signal to be distributed at least partially from one time slot to another. Because it is known that co-channel interference may occur for control channels as well as for communication channels, such staggering of time slots should be done for control signals as well as in the traffic.

As mentioned before, the staggering of time slots between carriers of adjacent clusters has the net of effect of distributing the co-channel interference sources from any one user to other users resulting in "interference averaging". An interfering signal, therefore, does not exclusively interfere with only one time slot, but rather with multiple time slots. Accordingly, relative to one time slot, the interfering signal is present for a shorter period of time. This interference averaging or distribution can only occur if the time slots of the different carriers are offset with respect to one another. Generally, if the time slots associated with the various carrier frequencies are all aligned in time, a strong interferer degrades the carrier-to-interferer performance ratio throughout the entire time slot of other users tuned to the same carrier frequency having the same time slot. In the system embodiment shown in FIG. 2, the time slots are automatically aligned in time if the invention is not practiced, given that the single satellite is being used as a source for the plurality of different cells and clusters. Accordingly, the interference may be averaged out by staggering the communications from satellite 20 of FIG. 2 to the various clusters 24 and 26. This distribution or averaging of interference for any one time slot, therefore, facilitates better signal correction by the various interleaving and channel coding techniques employed in communication systems, as is known to those skilled in the art. The use of appropriate error correction coding with such interference averaging, greater facilitates the recovery of bits in the effective part of a slot thereby reducing bit errors and bit error rates.

Referring again to FIG. 2, and as was stated before, the various signals 22 transmitted from satellite 20 to the various clusters, by way of example, cluster 24 or cluster 26, are ordinarily synchronized with each other because of the fact that they radiate from the same source, namely satellite 20. Timing controller 28 of satellite 20, in the embodiment of the invention shown in FIG. 2, staggers time slots of the traffic and control signals in a manner as shown in FIG. 4 for each of the signal beams 22 transmitted to the cell clusters 24 and 26. In this embodiment of the invention, each of the control and traffic channels of cluster 24 are staggered by a first predefined amount of delay, while each of the traffic and control channels of cluster 26 are staggered by a second predefined amount of delay. The amount of predefined delay for each of the clusters is controlled by timing controller 28 which is coupled to satellite 20 and which controls the timing of the transmission of signal beams 22 from satellite 20. While the timing controller 28 is shown functionally as a part of satellite 20, it is understood, that timing controller 28 can be placed in a ground based station wherein the coupling to the satellite is by way of wireless signal transmissions. In one embodiment of the invention, satellite 20 is, functionally, merely a transceiver wherein all control signals originate from a ground based controller.

In a more conventional system, such as that shown in the system of FIG. 3, each cluster 30 and 38 contains a plurality of cells. By way of example, each cluster may have seven cells f(1)–f(7) as shown in the embodiment of FIG. 1. In one embodiment of the invention herein, each cell within a cluster contains the same predefined delay or no delay in the case of the cells carrying the "reference" signals, which delay is used in staggering the transmissions from the cells within cluster 30. Thus, in one embodiment, one timing controller 31 is used to control the timing for each of the cells within cluster 30 while a separate timing controller 39 is used to control the timing for each of the cells within cluster 38.

In the embodiment of the invention, as shown in FIG. 3, it is also necessary to synchronize the internal clocks of the system of the various clusters with high precision so that these signals may be accurately staggered. By way of example, in FIG. 3, system clock 40 transmits clock values over lines 42 and 44 to timing controllers 31 and 39, respectively, so that the internal clocks of these two timing controllers are synchronized. In contrast, the system of FIG. 2 does not require the use of a clock for synchronization since it has only one timing controller and one clock for controlling all of the various signal beams 22 which were transmitted to the various clusters, such as clusters 24 and 26.

Figure 5:
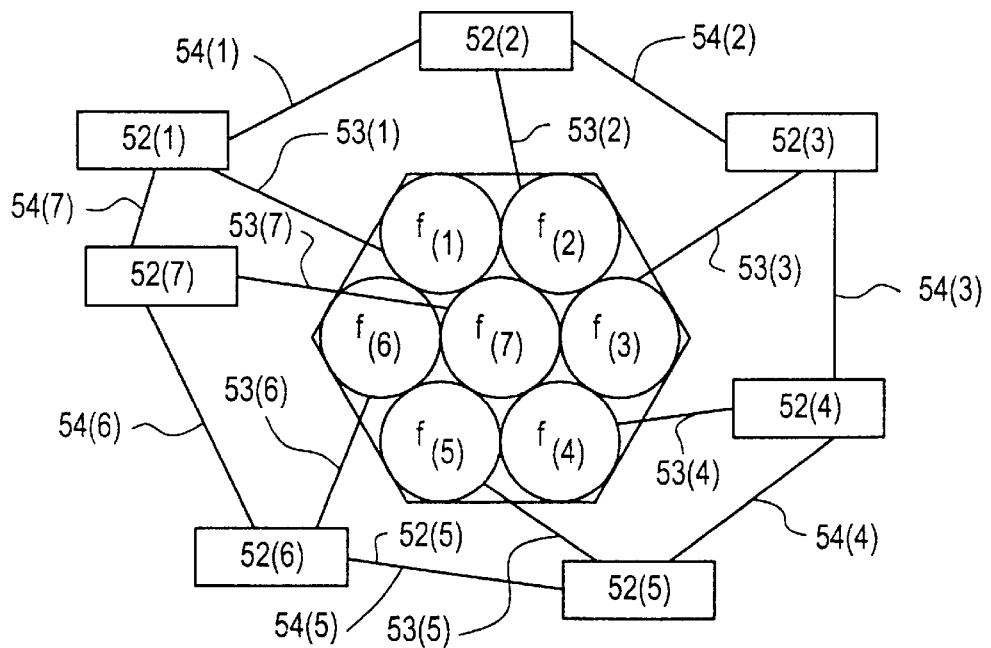
FIG. 5 is a system diagram illustrating the ground based base station system.

Referring now to FIG. 5, there is shown another embodiment in which each of the cells within cluster 50 contains its own timing controller 52(1)–52(7). As may be seen, each timing controller 52(1)–52(7) is coupled to cells f(1)–f(7) of cluster 50 by lines 53(1)–53(7), respectively. In this embodiment, all of the timing controllers 52(1)–52(7), are in communication with each other by lines 54(1)–54(7), respectively, to synchronize the staggering of the time slots.

Figure 6:
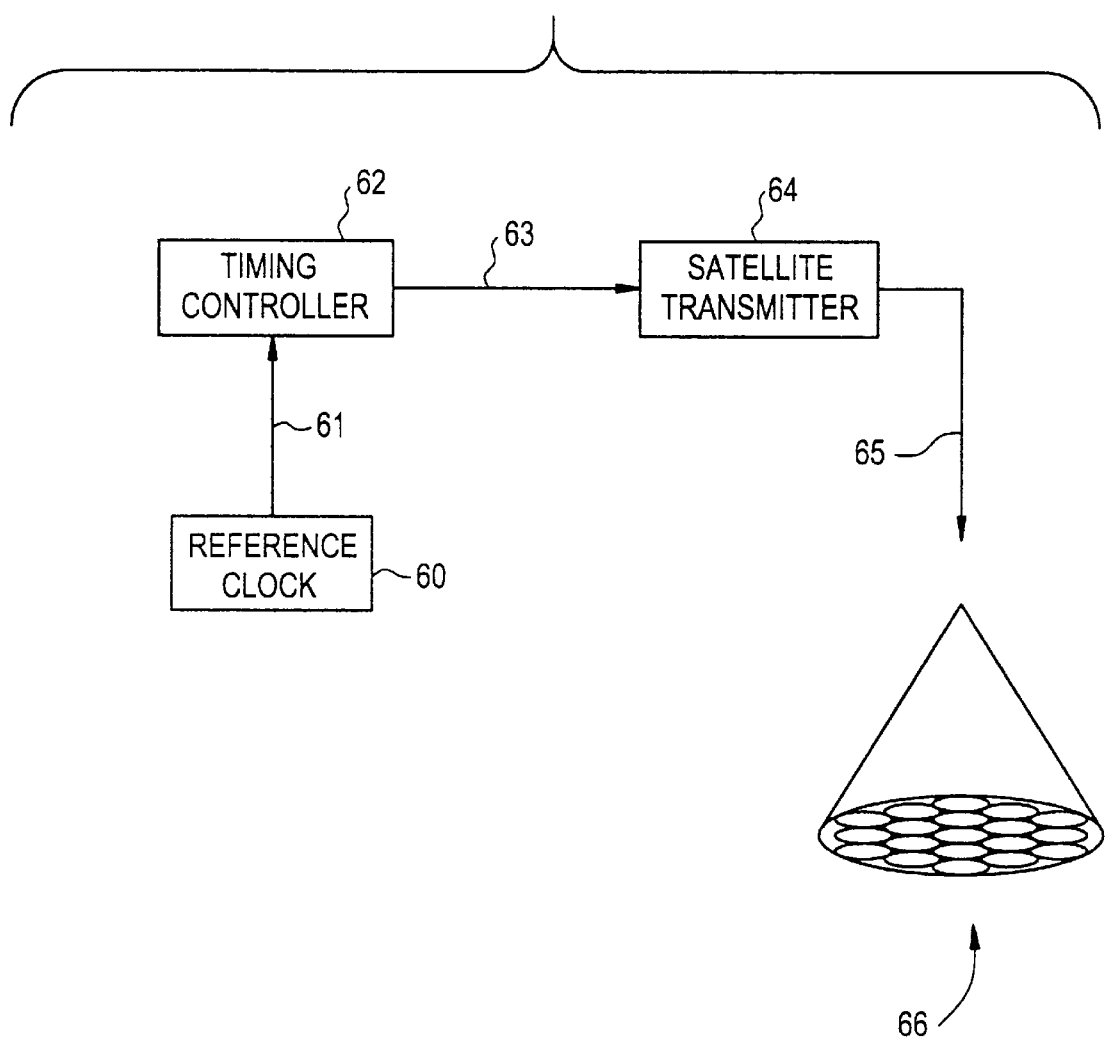
FIG. 6 is a system diagram illustrating the satellite based system.

Referring now to the block diagram of the embodiment of the invention as shown in FIG. 6, a reference clock 60 transmits a clock value over line 61 to timing controller 62 which then sends control signals over line 63 to satellite transmitter 64 for controlling the timing of the signal beams 65 which are transmitted to the terminal units within the cluster 66.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims. In particular, it will be understood that the present invention may be effectively utilized in connection with the allocation of either analog or digital traffic and control channels.

What is claimed is:

1. A communication system for transmitting TDMA signals for cellular communications during predefined time slots, the system comprising:

a plurality of cell clusters, each cell cluster including at least one cell, each cell including at least one frequency channel, wherein the at least one frequency channel is different from any other frequency channel within the same cluster;

at least one transmitter for transmitting TDMA signals within each of said cell clusters; and a controller for introducing a constant, predetermined amount of delay into the transmission of each TDMA time slot from a first transmitter in a first cell cluster, wherein the predetermined amount of delay prevents the TDMA time slot from being transmitted at the same time as a same TDMA time slot from a second transmitter in a second cell cluster to reduce co-channel interference between the TDMA timeslot from the first transmitter and the same TDMA timeslot from the second transmitter.

2. The communication system of claim 1 wherein the at least one transmitter is housed within at least one satellite.

3. The communication system of claim 1 wherein there is at least one transmitter located within each cell of the at least one cell of each cluster of the plurality of clusters.

4. The communication system of claim 1 wherein said controller causes the at least one transmitter to introduce the same predetermined amount of delay in the transmission of each TDMA time slot of the TDMA signal transmitted within one cluster of the plurality of clusters.

5. The communication system of claim 4 wherein the controller causes the at least one transmitter to introduce a different predetermine amount of delay for each of the TDMA signals transmitted from each of the clusters of the plurality of clusters.

6. The system of claim 1 wherein the controller further comprises a system clock for providing a clock reference signal from which to calculate the predetermined amount of delay.

7. The system of claim 1 wherein the controller further comprises a plurality of controllers located with each cluster of the plurality of clusters.

8. The system of claim 1 wherein the controller further comprises a plurality of controllers located within each cell of the plurality of cells.

9. A method for reducing co-channel interference in a communication system including at least one transmitter for transmitting TDMA signals within each of a plurality of clusters, each cluster of the plurality of clusters including at least one cell, the method comprising the steps of:

transmitting time slots of a TDMA signal from a first transmitter within a first cluster at a selected time; and delaying transmission of a same time slots of a TDMA signal from a second transmitter within a second cluster by a selected constant delay after transmission of the time slots from the first transmitter to reduce co-channel interference between the timeslots from the first transmitter and the corresponding timeslots from the second transmitter.

10. The method of claim 9 wherein the step of delaying further includes the step of synchronizing the transmission from the first and the second transmitters to ensure proper timing of the selected delay.

11. The method of claim 9, wherein a time to transmit the corresponding time slot of the TDMA signal for the second cluster is determined by waiting a prespecified amount of time after the transmission of control and traffic signals by said first cluster.

12. A method for reducing co-channel interference in a communication system including at least one transmitter for transmitting TDMA signals within each of a plurality of clusters, each cluster of the plurality of clusters including at least one cell and having a timing controller associated therewith, the method comprising the steps of:

synchronizing transmissions of corresponding TDMA time slots from each of the transmitters in the plurality of clusters using at least one timing controllers; and delaying transmissions for each corresponding TDMA time slots transmitted from each of the transmitters within the plurality of clusters by a constant amount, wherein the amount of delay for each of the corresponding TDMA time slots prevents any two corresponding TDMA time slots in different clusters from being transmitted at a same time to reduce co-channel interference between any two corresponding TDMA timeslots.

13. The method of claim 12 wherein each cluster has a single controller and the step of synchronizing further comprises synchronizing each transmitter within the cluster according to the single controller.

* * * * *